United States Patent [19]

Kuriloff

[11] Patent Number: 5,157,320

[45] Date of Patent: Oct. 20, 1992

[54] COMPUTERIZED BATTERY CHARGER

[75] Inventor: Fredric M. Kuriloff, Oakland, N.J.

[73] Assignee: Tyco Industries, Inc., Mt. Laurel, N.J.

[21] Appl. No.: 742,111

[22] Filed: Aug. 8, 1991

[51] Int. Cl.[5] .............................................. H02J 7/04
[52] U.S. Cl. ...................................... 320/39; 320/20; 320/21
[58] Field of Search ............................. 320/20, 21, 39

[56] References Cited

U.S. PATENT DOCUMENTS

| | | | |
|---|---|---|---|
| 3,794,905 | 2/1974 | Long | 320/20 |
| 3,911,349 | 10/1975 | Seeley et al. | 320/20 |
| 3,938,021 | 2/1976 | Kosmin | 320/40 |
| 3,992,658 | 11/1976 | Bechtold et al. | 320/20 |
| 4,118,661 | 10/1978 | Siekierski et al. | 320/40 |
| 4,146,830 | 3/1979 | Foster | 320/23 |
| 4,213,081 | 7/1980 | Taylor | 320/40 |
| 4,234,839 | 11/1980 | King et al. | 320/36 |
| 4,353,148 | 10/1982 | Tada et al. | 320/20 |
| 4,388,582 | 6/1983 | Saar et al. | 320/20 |
| 4,392,101 | 7/1983 | Saar et al. | 320/20 |
| 4,528,492 | 7/1985 | Inaniwa et al. | 320/36 |
| 4,564,800 | 1/1986 | Jurjaus | 320/36 |
| 4,623,832 | 11/1986 | Fujiwara | 330/23 |
| 4,639,655 | 1/1987 | Westhaver et al. | 320/14 |
| 4,746,852 | 5/1988 | Martin | 320/20 |
| 4,746,854 | 5/1988 | Baker et al. | 320/40 |
| 4,767,977 | 8/1988 | Fasen et al. | 320/20 |
| 4,806,840 | 2/1989 | Alexander | 320/20 |
| 4,855,663 | 8/1989 | Matsui et al. | 320/20 |
| 4,918,368 | 4/1990 | Baker et al. | 320/40 |

Primary Examiner—Steven L. Stephan
Assistant Examiner—Adolf Berhane
Attorney, Agent, or Firm—Panitch Schwarze Jacobs & Nadel

[57] ABSTRACT

A battery charger for rapidly charging batteries of different capacity types is controlled by a microprocessor. The microprocessor controller is also connected to a voltage source which is connected to the battery for supplying a charging current to the battery at a current value selected by a user. The controller is also connected to a voltage reference generator which generates a reference voltage equal to a conditioned battery voltage at the beginning of a charging cycle. The reference voltage increases in predetermined voltage increments as the battery voltage increases during the charging cycle until the battery voltage reaches a peak voltage. A comparator compares the conditioned battery voltage to the reference voltage and sends the results of the comparison to the microprocessor controller. The microprocessor controller causes the reference voltage generator to increase the reference voltage by a predetermined voltage increment if the conditioned battery voltage is greater than the reference voltage. If the conditioned battery voltage is less than the reference voltage for a first predetermined time period, the microprocessor causes the voltage source to decrease the charging current to a trickle charge.

8 Claims, 5 Drawing Sheets

COMPUTERIZED BATTERY CHARGER

BACKGROUND OF THE INVENTION

The present invention relates to a battery charger for rapidly charging a battery and, more particularly, to a computerized battery charger which controls the amount of charging current supplied to the battery and reduces the charging current to a trickle current when the battery is fully charged.

Although there are several methods available for rapidly charging batteries, these methods fail to quickly stop the charging current being supplied to the battery once the battery is fully charged. If a battery continues to be charged after it has been fully charged, the overcharging may destroy or damage the battery. Thus, it is desirable to have a battery charger which is capable of rapidly supplying a charging current to a battery which quickly discontinues the charging current once the battery is fully charged.

Previously, conventional types of battery chargers have attempted to control the charging of a battery by detecting a peak battery voltage condition, and discontinuing the charging current upon the detection of such a peak battery voltage. When a microprocessor has been used in such a battery charger, the battery voltage is usually monitored by the microprocessor which calculates the slope of the battery voltage. As long as the voltage of the battery is increasing, the calculated slope is positive, and upon the decrease of the battery voltage, the calculated slope is negative. Upon calculating a negative slope, the microprocessor assumes that the battery has become fully charged and stops the charging current. The problem with such a method of detection is that the microprocessor must be able to quickly and continuously sample the battery voltage in order to make a slope calculation. When a battery voltage is about to reach its peak, the voltage increases rapidly. The opposite is true once the peak has been reached. Therefore, in order for the microprocessor to calculate the slope just before and just prior to the peak battery voltage, the battery voltage should be sampled quickly.

Additionally, although the use of microprocessors in battery chargers has eliminated some of the conventional problems regarding battery charging, the use of microprocessors has created new problems. Primarily, when microprocessors have been used in battery chargers, the circuits used to incorporate the microprocessor into the battery charger have been complex. The use of complex circuits serves to increase the cost of manufacturing a battery charger, as well as decreasing the reliability of the charger. Furthermore, when microprocessors have been used with battery chargers, time has been wasted by continuously converting and processing data for the microprocessor. One previous battery charger uses a microprocessor within a complex circuit containing a voltage controlled oscillator (VCO). Digital data defining a threshold value is introduced by the microprocessor and subsequently stored. The battery voltage during the charging is converted into digital data and is also stored in memory. When the battery voltage sampled is greater than the last sample taken, the stored value is updated in memory. If the most recently sampled battery voltage is less than the stored data, the difference is compared with the stored digital threshold value. If the difference is greater than the stored digital threshold value, it is assumed that the battery has reached its peak voltage and the charging current is discontinued.

The problems with such a method of discontinuing a charging current are inherent. Because every sample taken must be digitized and stored, the processing time required for each sample taken is relatively high. Generally, the battery voltage is checked approximately once every second. As stated previously, as the peak voltage in a battery is approached, the voltage increases rapidly. Thus, it is imperative to take samples quickly to be able to detect changes in the battery voltage. Because of the processing time, required samples may be taken only once every second, resulting in a substantial delay before the peak battery voltage is actually detected by the microprocessor. A subsequent delay occurs before the voltage to the battery is discontinued because the microprocessor must still digitize and further process the received voltage data.

The concept of using a microprocessor to detect the peak voltage is foremost a safety feature. The goal of such devices is to prevent possible damage to the battery from overcharging. Nevertheless, if the battery overheats, the battery may be damaged. Conventional battery chargers incorporating microprocessors have failed to take this contingency into account.

A need has developed for a battery charger which is able to rapidly charge a battery and discontinue a charging current to the battery very soon after the battery has attained full charge. Such a battery charger is particularly desirable when it incorporates additional safety features such as checking the temperature of the battery during charging and discontinuing charging when the battery is fully charged or if the battery becomes overheated.

SUMMARY OF THE INVENTION

Briefly stated, the present invention comprises a battery charger for rapidly charging a battery. The battery charger comprises a voltage source connected to the battery with a charge line which supplies a high charging current to the battery at a selected current value. Sensing means are provided for continuously sensing the voltage of the battery and providing a conditioned battery voltage output. A voltage reference generator generates a reference voltage equal to the conditioned battery voltage at the beginning of a charging cycle and increases the reference voltage in predetermined voltage increments as the battery voltage increases during the charging cycle until the battery reaches a peak voltage. A comparison means receives the reference voltage and the conditioned battery voltage, compares the received voltages and generates an output signal. The charging of the battery is controlled by a computer control means which receives the output signal from the comparison means. The control means causes the reference voltage generator to increase the reference voltage by a predetermined voltage increment if the conditioned battery voltage is greater than the reference voltage. The control means also decreases the charging current to a trickle charge if the conditioned battery voltage is less than the reference voltage for a first predetermined time period.

BRIEF DESCRIPTION OF THE DRAWINGS

The foregoing summary, as well as the following detailed description of the presently preferred embodiment of the invention will be better understood when read in conjunction with the appended drawings. For the purpose of illustrating the invention, there is shown in the drawings an embodiment which is presently preferred. It should be understood, however, that the present invention is not limited to the particular arrangements and instrumentalities shown. In the drawings.

DESCRIPTION OF THE PREFERRED EMBODIMENT

The presently preferred embodiment of the invention described below relates to a battery charger for rapidly charging a battery.

Figure 1:
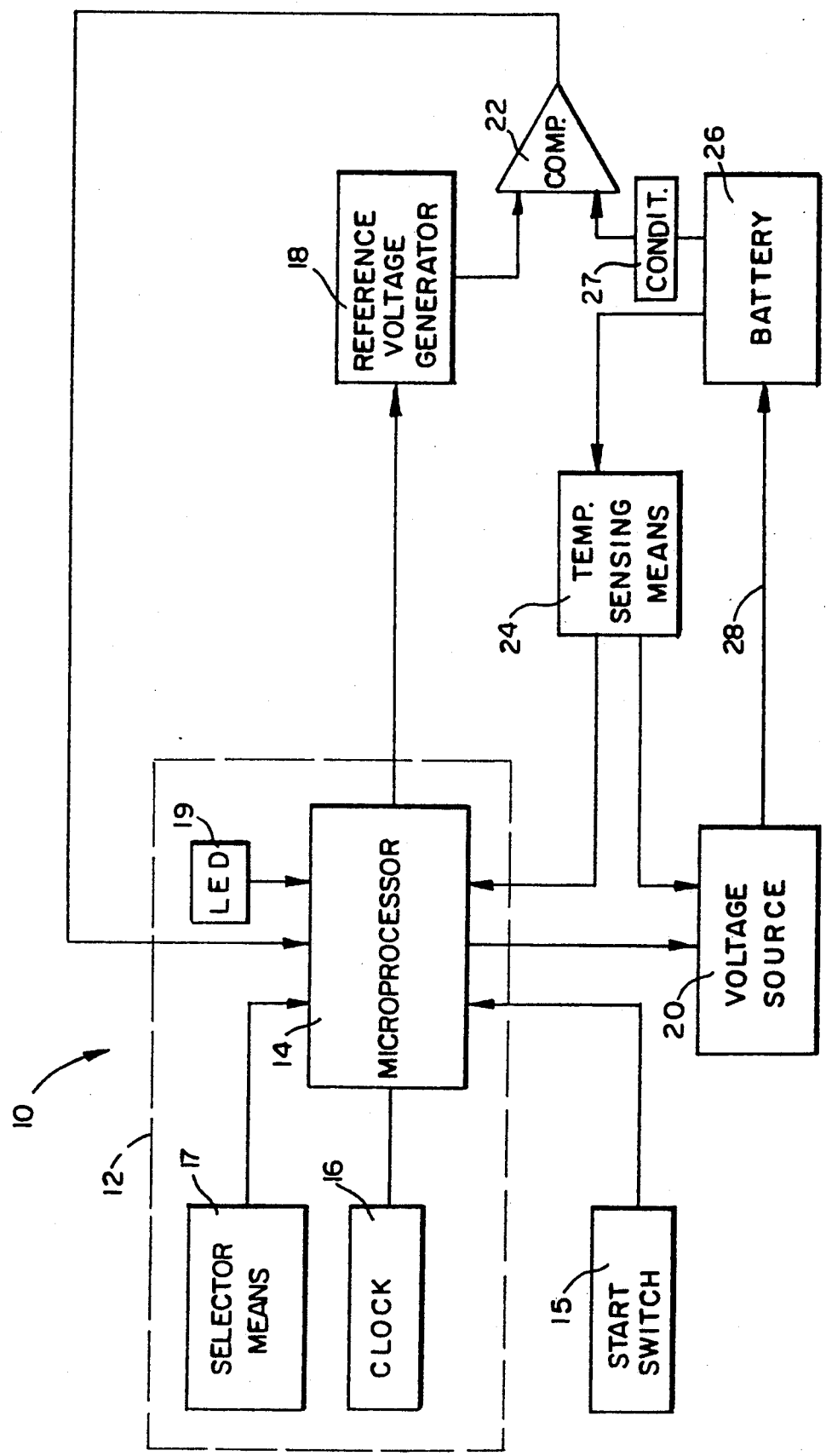
FIG. 1 is a functional block diagram of a battery charger in accordance with a preferred embodiment of the present invention.

FIG. 1 is a functional block diagram illustrating the primary functional components of a preferred embodiment of the battery charger, hereinafter referred as a charger 10. The charger 10 charges a battery 26. The battery 26 preferably is a nickel-cadmium (Ni-Cad) battery or some other type of battery capable of being recharged, and may also be a multiple cell pack type. The charger 10 in the preferred embodiment of the invention is capable of charging batteries or battery packs having different capacities, for example, 9.6 volts, 8.4 volts, 7.2 volts, 6.0 volts and 4.8 volts. The battery 26 may be used to power toys, such as remotely controlled toy vehicles. Because the battery 26 may be used to power toys, it is desirable to have a battery 26 which can be charged quickly, so that the user of the toy does not have to wait for a prolonged period in order to play with the toy while the battery 26 is being charged.

The battery 26 is connected to a voltage source 20 which supplies the current necessary to charge the battery 26. The voltage source 20 may be connected to a normal 110 volt outlet (not shown) or to a DC power source such as a vehicle battery (not shown), for example, through a cigarette lighter outlet (not shown) or to a separate AC power supply. The voltage source 20 is connected to the battery using a quick connection (not shown) with a single charge/trickle line 28. The voltage source 20 is thereby able to supply a high charging current over line 28 to allow the battery 26 to be rapidly charged. The voltage source 20 is also capable of supplying a trickle current to the battery over the line 28 to maintain the battery 26 in a fully-charged state once it has been fully charged with the high charging current.

The voltage to be supplied to the battery is determined by a selector means 17. The user is able to select the appropriate charging current the voltage source 20 supplies to the battery by using the selector means 17 to select the appropriate voltage. The voltage to be supplied to the battery 26 is based on the rated capacity of the particular battery 26 (e.g., 9.6 volts, 8.4 volts, etc.).

A sensing means or voltage conditioner 27 is connected to the battery 26 for continuously sensing the actual voltage of the battery and for "conditioning" or reducing the actual sensed battery voltage to a level suitable for comparison with a reference voltage. The output of the sensing means on voltage conditioner 27 is connected to one input of a comparison means or comparator 22. Connected to another input of the comparator 22 is a reference voltage generator 18. The reference voltage generator 18 generates a reference voltage which is equal to the conditioned voltage of the discharged battery 26 at the beginning of a charging cycle. The voltage reference generator 18 subsequently increases the generated reference voltage in predetermined voltage increments once the charging cycle begins. In the present embodiment, each of the predetermined voltage increments are 20 millivolts but some other increment could be selected, if desired. The reference voltage is incrementally increased by the reference voltage generator 18 as long as the battery voltage continues to increase due to the charging of the battery 26. Once the battery voltage reaches a peak, indicating that the battery 26 is fully charged, the reference voltage is no longer increased but remains constant.

The comparator 22 receives both the reference voltage generated by the reference voltage generator 18 and the conditioned battery voltage. Upon receiving the two voltages, the comparator 22 compares the conditioned battery voltage to the reference voltage to determine which voltage is higher. The comparator 22 also generates an output signal indicating the comparison results.

The output signal generated by the comparator 22 is received by a computer control means or controller 12. The computer control means 12 includes a microprocessor 14 that is also connected to both the reference voltage generator 18 and the voltage source 20. The microprocessor 14 controls the voltage reference generator 18 and the voltage source 20. The microprocessor 14 receives the output signal from the comparator 22 and causes the reference voltage generator 18 to increase the reference voltage in the predetermined voltage increments as long as the conditioned battery voltage is greater than the reference voltage. Once the reference voltage is at the same level as the conditioned battery voltage, the microprocessor 14 begins checking for a drop in the voltage of the battery.

If the conditioned battery voltage is less than the reference voltage for a first predetermined time period, the microprocessor 14 causes the voltage source 20 to decrease the charging current to a trickle charge. A decrease in the conditioned battery voltage with respect to the reference voltage indicates that the battery voltage has peaked and, thus, the battery is fully charged. In the present embodiment, the first predetermined time period is 8.5 seconds but it will be appreciated that some other time period could be used. Once the battery voltage has peaked, the trickle charge is employed to maintain the battery in its fully-charged state.

If the conditioned battery voltage is not less than the reference voltage for the first predetermined time period, the microprocessor checks to see if the conditioned battery voltage is still increasing. If the conditioned battery voltage does not increase by a predetermined voltage in a second predetermined time period, the microprocessor 14 assumes the battery 26 is fully charged and proceeds into the trickle charge routine. In the present embodiment, the second predetermined time period is 4 minutes and the predetermined voltage is 20 millivolts, but it will be appreciated that some other time period or voltage increment could be used.

If the microprocessor 14 determines that the conditioned battery voltage has increased, it checks to see if the voltage increase continues for a third predetermined time period before causing the reference voltage generator 18 to again generate a new reference voltage. Using the microprocessor 14 to check for the increase in conditioned battery voltage within the third predetermined time period eliminates false readings. In the present embodiment, the third predetermined time period is 1.75 seconds, but it will be appreciated that some alternative time period could be used.

The microprocessor 14 receives the various signals and causes the charging current to be supplied to the battery and causes the reference voltage to be generated. The computer control means 12 also contains a timing clock 16 and an indicating means or light-emitting diode (LED) 19 connected to the microprocessor 14. The clock 16 controls the timing functions required of the microprocessor 14. The LED 19 indicates to the user of the charger 10 when charging current is being supplied to the battery 26 and when a trickle charge is being supplied to the battery 26. A start switch 15, preferably an on/off switch, is connected to the microprocessor 14 to enable the user to turn the charger 10 on and off.

The microprocessor 14 is also in communication with a temperature sensing means 24. The temperature sensing means 24, in addition to being connected to the microprocessor 14, is connected to the battery 26 and to the voltage source 20. The temperature sensing means 24 continuously senses the temperature of the battery 26 in a manner which will presently be understood. The temperature sensing means 24 while sensing the temperature of the battery 26, signals to the microprocessor 14 if the temperature of the battery rises above a first predetermined temperature. In this manner, the microprocessor 14 can interrupt the charging of the battery 26 if the first predetermined temperature is exceeded, thereby preventing damage to the battery 26. In the present embodiment, the first predetermined temperature is 125° F. but it is understood that some other suitable temperature limit may be employed.

The temperature sensing means 24 also causes the voltage source 20 to discontinue supplying charging current to the battery 26 if the battery temperature rises above a second predetermined temperature which is higher than the first predetermined temperature. In the present embodiment, the second predetermined temperature is 130° F. but some other temperature may alternatively be used. Once the second predetermined temperature is exceeded, further charging of the battery is precluded. This feature protects the battery 26 from overcharging, if the microprocessor 14 does not interrupt the charging of the battery 26 when the first predetermined temperature is exceeded.

Thus, it should be appreciated by those skilled in the art, that the primary purpose of the control means 12 is to control the charging of the battery 26 by controlling the voltage source 20 with the microprocessor 14. Once the battery 26 is connected with the charger 10 and the start switch 15 is actuated, the microprocessor 14 generally signals the voltage source 20 to begin charging the battery 26 at the voltage selected by the user with the selector means 17. The voltage source 20 then begins to rapidly charge the battery 26 over the single charge line 28. Simultaneously, the microprocessor 14 commands the reference voltage generator 18 to generate the reference voltage which is equal to the conditioned battery voltage at the beginning of its charging cycle and is increased in predetermined increments as the battery voltage increases. The microprocessor 14 is able to continuously monitor the charging cycle of the battery through the comparator 22 and to control the charging cycle according to the results of the comparisons made by the comparator 22.

Figure 2:
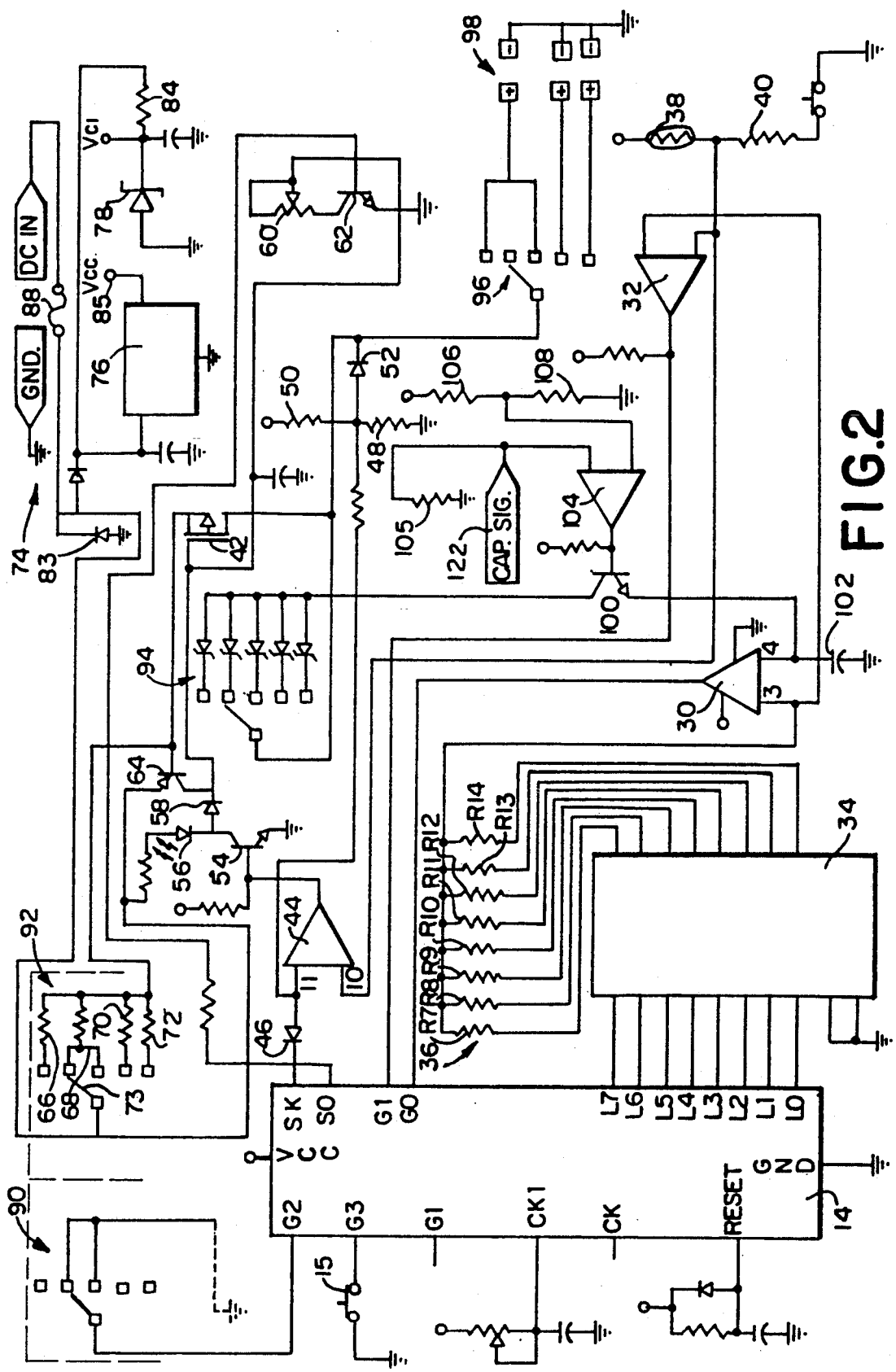
FIG. 2 is a more detailed circuit diagram showing the battery charger of FIG. 1.

Turning now to FIG. 2, there is shown a detailed circuit diagram of a preferred embodiment of the battery charger 10. The microprocessor 14 preferably is a COP413L. As indicated, the microprocessor 14 controls the charger 10 through a plurality of inputs and outputs. The input shown at G3 is connected to the start switch 15 is shown in FIG. 1. The input at G2 is used to tell the microprocessor 14 if the current going to the battery should be pulsed, which is the case if the battery is being charged from an automobile battery.

The input at pin CK1 is a clock RC network forming the timing means 16 shown in FIG. 1. Preferably the RC time constant is set in order to give the longest instruction time, thus allowing the microprocessor to use a minimum amount of memory for timing functions. Preferably a 68pf capacitor and a 100K ohm pot are used to set the CK1 at an operating frequency of 200 KHz. This gives a 20 microsecond instruction cycle time.

In the preferred embodiment of the invention, the RESET input is set for a 0.001 second hold time which is also established by an RC timing circuit as shown. The other two inputs shown at pins G0 and G1 are used to receive the output of operational amplifiers 30 and 32, respectively. All of the operational amplifiers in the present embodiment preferably are an LM3302. The input at G0 receives the results of the comparison between the generated reference voltage and the battery voltage, and the input at G1 is used to obtain a reading of the battery temperature. The output of the microprocessor 14 includes two pins, SK and SO for controlling the charging current to the battery, and a series of L ports for controlling the generated reference voltage. The L ports shown in FIG. 2 as L0 through L7 are used to create a digital to analog converter (DA converter). The L ports function to count from 0 to 255 in binary. A 256 count means that the DA network is at 5 volts which is the equivalent of 19.5 mv/step. Thus, the circuit is able to detect a change in the battery voltage of 19.5 millivolts. It is understood that some other alternative charge value could be used.

The output of the L ports is buffered by a buffer chip 34, preferably a 74HC244. The buffer chip 34 is needed because the normal L port output cannot provide enough current to maintain a high level when the other outputs are low. The buffer chip 34 is able to maintain a high enough source current so that the output does not decrease while sourcing current. By using a buffer chip 34, all 8 L port outputs are on the same substrate. The outputs of the buffer chip 34 are connected to a parallel resistor network 36 comprised of individual resistors R7 to R14. The resistor network 36 creates 256 voltage levels, depending upon the output count from the microprocessor 14, which serve as the reference voltages which are input to the comparator 22 shown in FIG. 1. Preferably, the values of the resistors in the resistor network 36 range from 30.1K ohms to 3.9M ohms, although it is understood that different resistor values may be used.

The output voltage (reference voltage) of the resistor network 36 is applied to two voltage comparators. The first comparator is an operational amplifier 30 having a second input which receives the conditioned voltage from the battery and generates an output which goes high whenever the voltage generated by the resistor network 36 is greater than the conditioned battery voltage. The output of operational amplifier 30 goes to the microprocessor 14 through input G0. The output of the resistor network 36 is also applied to one input of the operational amplifier 32. The operational amplifier 32 is used to obtain a reading of the battery temperature. A thermistor 38 which is preferably a 1H103T thermistor manufactured by Thermodisc, decreases in resistance as the battery temperature rises. When this occurs, the voltage across resistor 40 rises thereby increasing the voltage which is applied to the second input of operational amplifier 32. When the second input to operational amplifier 32 exceeds the reference voltage, the output of operational amplifier 32 goes high. The output of the operational amplifier 32 goes to input G1 of the microprocessor 14.

The other outputs SO and SK of the microprocessor 14 are used to control the charging of the battery through a P channel MOSFET 42 which preferably is an IRF 9531. The output of the microprocessor 14 at the SK pin goes to an operational amplifier 44. The function of the operational amplifier 44 is to act as a safety feature. Diode 46 on one input (pin 11) of the operational amplifier 44 blocks the high DC level coming out of the microprocessor 14. Pin 11 of the operational amplifier 44 is at a level of 4 volts whenever the SK output of the microprocessor 14 is high. Pin 11 is held at 4 volts by resistor divider network 48 and 50. Diode 46 does not conduct as long as the voltage on its anode is greater than the voltage at the junction of resistors 48 and 50, whose junction is generally at 4 volts. If the battery is bad or shorted for any reason, pin 11 on operational amplifier 44 drops below 4 volts. If it reaches a level of 2.0 volts, which compensates for the voltage drop of the diode 46, the output of the operational amplifier 44 goes high which shuts down the charging circuit.

The second input (pin 10) on operational amplifier 44 is normally at a level of 2.5 volts because at room temperatures, thermistor 38 has a resistance of 10K. Thus, the junction of the thermistor 38 and resistor 40 will be at a level of 2.5 volts with a bias voltage $V_{cc}$ of 5 volts. In order to turn the charging circuit on, the output SK from the microprocessor 14 is made high. When the SK output is made high, pin 11 of operational amplifier 44 is also made high. When the SK output is made high, pin 11 of the operational amplifier 44 reaches the 4 volt level. Because 4 volts on pin 11 is higher than the 2.5 volts on pin 10, the output of the operational amplifier 44 is also high. The high output of the operational amplifier 44 causes transistor 54 to conduct. When transistor 54 conducts, LED 56 turns on to show that charging is occurring. The collector of transistor 54 is now at ground. The ground is blocked by diode 58. Resistor 60 and transistor 62 holds the gate of the MOSFET 42 at ground. When the output SO of the microprocessor 14 is also high, the MOSFET 42 switches on, thus sourcing current to the battery. Whenever charging is occurring, transistor 62 remains on because the SO output is high. Transistor 62 is required so that when charging is taking place, the gate of the MOSFET 42 is maintained low. Transistor 62 makes sure that no leakage current is flowing through the MOSFET 42 into the battery by allowing the gate of the MOFSET 42 to go high when the battery is not charging.

The charging current from an AC power supply 110 or battery flows through one of four resistors, 66, 68, 70 and 72 with values of 0.51 and 1.5, at 2 watts and 0.15 and 0.13, at 5 watts, respectively. The resistors 66, 68, 70 and 72 comprise section 92 of the selector means 17 of FIG. 1 which will be presently explained. The voltage drop across the chosen resistor increases until it reaches about 0.6 volts. When this occurs, transistor 64 conducts causing current flow through resistor 60 and transistor 62 which makes the gate of the MOSFET 42 positive. When the gate of the MOSFET 42 becomes positive, the resistance of the MOSFET 42 increases and limits the current flow to the battery. The differing values of the resistors 66, 68, 70 and 72 causes a different maximum current to flow when the selector switch 73 is positioned to one of the various possible voltage ranges depending upon the size of the battery being charged.

The selector means 17 of FIG. 1 enables the user to select the current to be applied to the battery and also to select the battery voltage conditioning to be applied for proper operation of the charger circuit based upon the particular battery to be charged. Preferably, the selector means 17 includes a ganged or rotary switch which causes each part of the selector means to be synchronized with the other parts of the selector means. The four parts of the selector switch are shown in FIG. 2 at 90, 92, 94 and 96. When the user selects a voltage of 8.4 volts, for example, selector switch component at 90 is connected to 8.4 volts, while the component at 92 is at resistor 68 and the diode at 94 is at 6.2 volts for reasons which will subsequently be understood. Section 96 of the selector switch is connected to the battery connectors 98. Such a common selector switch arrangement prevents the battery from being damaged.

The diodes at 94, as indicated, are switched into the circuit depending on the voltage range chosen. The diodes, which preferably are zener diodes, condition or lower the output of the battery voltage so that the conditioned voltage produced is in the range of the reference voltages generated from the microprocessor 14 with the resistance network 36. If, for example, a battery is being charged with 9.6 volts, the current level in each cell rises to a level of approximately 1.6 volts. Therefore, the charge voltage on a 9.6 volt battery will be approximately 12.8 volts when the battery is being charged. The use of the zener diodes 94 lowers or conditions the voltage of the battery so an analog comparison can be performed by operational amplifier 30. If the 12.8 volt level indicator is lowered by 9.1 volts, which is the value of the zener diode corresponding to a 9.6 volt level, the voltage sent to the comparator 30 is at a conditioned voltage level of 3.7 volts which puts the conditioned voltage in the range of the analog voltage signal generated by the microprocessor 14 through the resistor network 36. The other diodes on the selector switch portion 94 perform the same function for the other possible battery voltages. In the preferred embodiment of the invention, the values of the zener diodes at 94 differ according to which particular battery voltage they are aligned with. The zener diode for the 9.6 voltage level has a value of 9.1 volts and is a IN5239. The zener diode for the 8.4 voltage level has a value of 8.2v and is a IN52378. The zener diode for the 7.2 voltage level has a value of 5.8 volts and is a IN52358. The zener diodes for the 6.0 and 4.8 voltages levels have values of 5.1 and 4.8 volts, respectively and are IN52318 and IN52298. Thus, with the present invention, the voltage of the battery while being conditioned or stepped down to a lower analog level does not have to be converted into a digital number to effectuate a comparison with the reference voltage generated by the microprocessor 14.

If the microprocessor 14 receives a voltage above a level of 4.5 volts, it recognizes that the user has set the selector switch too low for the battery being charged. This is because the zener diode 94 does not drop enough voltage and pin 4 of operational amplifier 30 is above the 4.5 voltage level causing the output of the operational amplifier 30 to go low. If this occurs, the microprocessor 14 shuts off the charging current. If the opposite is true and the user has set the selector too high, then the voltage at pin 4 on operational amplifier 30 will be below 0.8 volts and the microprocessor 14 recognizes that the selector switch is in the wrong position, and turns off the charging current.

The voltage source of the charger 10 is designed to either be an automobile battery or a separate AC power supply. The charger 10 includes a power supply circuit 74 shown in the upper right-hand corner of FIG. 2. A voltage regulator 76, which is an LM7805, is used to supply the bias voltage $V_{cc}$ of 5 volts to the microprocessor 14 and the other circuit components. Diode 78 and resistor 84 raise the voltage 2.1 volts above $V_{cc}$ so the voltage at $V_{C1}$ can power the various operational amplifiers. This is required to prevent a problem when an input of the operational amplifier is close to the power of the operational amplifier. Diode 83 prevents the user from applying reverse polarity to the charger 10. Hence, if automobile plug 89 is plugged into the automobile lighter socket backwards, diode 83 conducts causing fuse 88 to blow.

Figure 3:
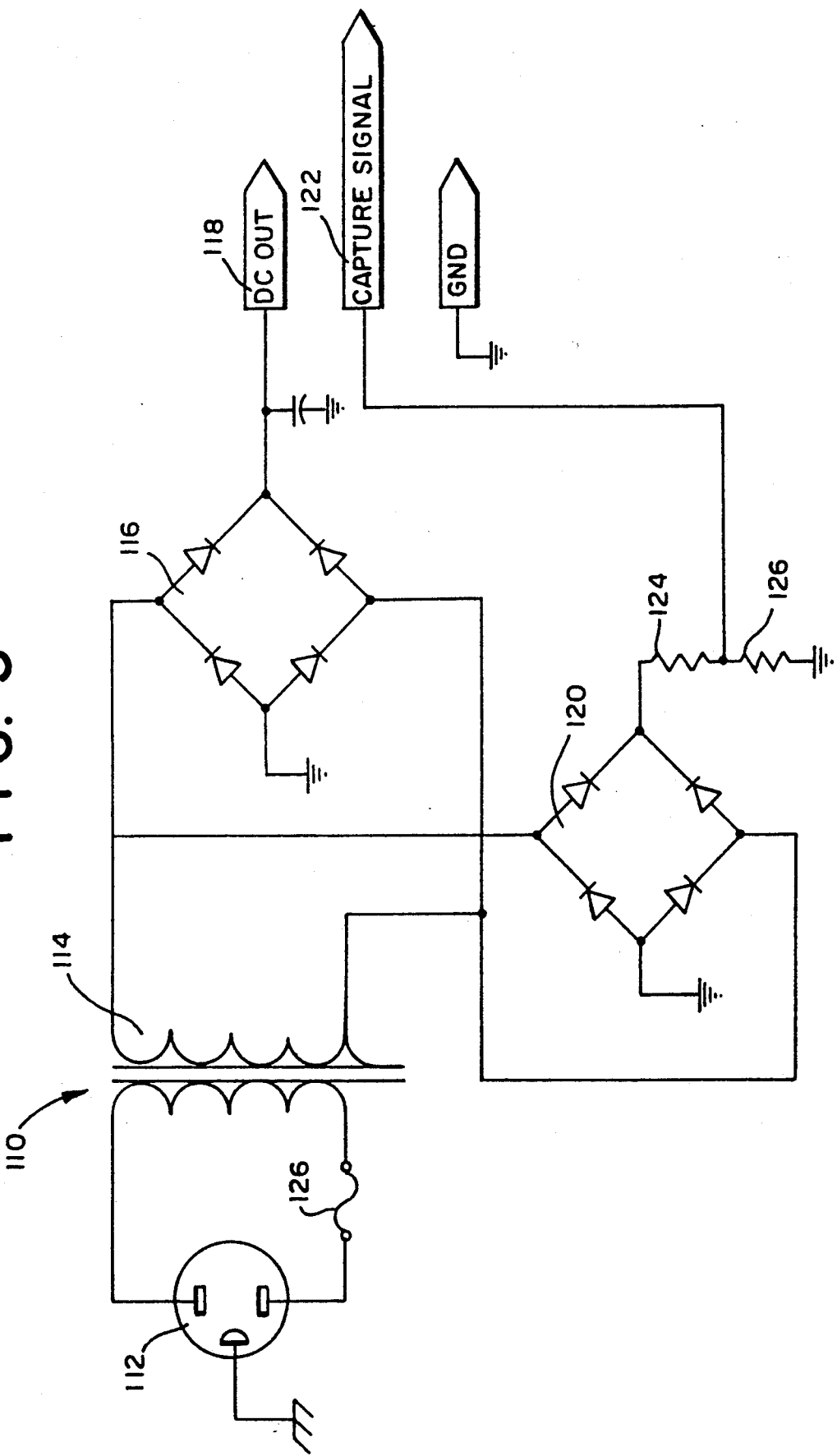
FIG. 3 is a more detailed circuit diagram showing a portion of a preferred AC power supply of the battery charger of FIG. 1.

If an AC power source is used, FIG. 3 shows a preferred AC power supply 110 with a three pin adaptor plug 112. A four-pin connector (not shown) is used between the power supply 110 and the remainder of the circuitry shown in FIG. 2. When AC power is used, three of the pins are used to provide the DC power, a capture signal and ground to the other circuitry. If an automobile or other battery is used as a power source, no capture signal is present at the connector and the fourth pin of the connector is connected to the ground cable of the battery and to selector switch 90 as shown in phantom on FIG. 2. The ground from the fourth connector pin is used to cause the microprocessor 14 to pulse the charging current. The power supply 110 in the preferred embodiment, contains a transformer 114 of preferably 12.6 volts. The preferred transformer is an EM 23474B by Electromech, Inc. The output of the transformer 114 is sent to a bridge rectifier 116, which is preferably at a 10 amp level. The output of the bridge rectifier 116 feeds from the DC OUT 118 to the charging circuit of the charger 10, shown in FIG. 2, at the DC IN. Preferably, the charging circuit is employed for a maximum peak current of 5 amps. The use of a 10 amp bridge rectifier 116 is for safety reasons. The bridge rectifier 116 is preferably mounted on a 10 watt heat sink (not shown). A bridge rectifier 120, which may also be a four diodes mounted in parallel with bridge rectifier 116, is used to generate a capture signal 122 for the charging circuit shown in FIG. 2. Because the battery is only being charged when the output of the bridge rectifier 116 is higher than the battery voltage, the sensing capabilities of the charging circuit of FIG. 2 must ignore the battery voltage when the battery 32 is conducting. The capture signal 122 performs this function.

The output of the bridge rectifier 120 proceeds to a voltage divider comprised of resistors 124 and 126 which preferably have values of 10K and 3.3K. The voltage divider lowers the voltage level going to the operational amplifier 104 shown in FIG. 2. The divided signal resulting from the resistor network 124 and 126 is the capture signal 122.

The capture signal 122 coming from the AC power supply 110, preferably is a pulse signal. The resistors 124 and 126 lower the voltage so as not to damage the input of an operational amplifier 104. Whenever the secondary transformer 114 is lower than a predetermined level, preferably 0.5 volts, the output of the operational amplifier 104 rises. The output of the operational amplifier 104 only rises when the battery is conducting. The resistor network, comprised of resistors 106 and 108 which preferably have values of 100K and 10K, respectively, sets the preferred voltage level. When the output of the operational amplifier 104 rises, transistor 100 is turned on which allows the step-down voltage from the battery to charge a capacitor 102 on the negative input of operational amplifier 30, which acts as a comparator. If an automobile battery is being used to charge the battery instead of the AC power supply, the capture signal 122 is not present and the negative input of the operational amplifier 104 is held at ground by the resistor 105. Thus, the transistor 100 is continuously conducting.

Even though it is unlikely that the battery being charged will overheat, the design of the present invention includes two safeguards to prevent such an occurrence. First, the microprocessor reading of the battery temperature is used to ascertain if the battery temperature is too high. Operational amplifier 32 is used as a sensor to read the temperature of the battery. The resistance of the thermistor 38 decreases as the temperature of the battery rises causing the voltage across resistor 40 to rise. The output of the thermistor 38 is fed to the positive input of operational amplifier 32. The output of operational amplifier 32 feeds into the microprocessor 14. By adjusting the output of the DA converter, the output of the thermistor 38 can be converted into a binary number. The junction of the thermistor 38 and the resistor 40 is at the first predetermined level, preferably 3.75 volts when the battery temperature reaches a first predetermined temperature level, which, as previously stated, is preferably 125° F. If the junction of the resistor is at 3.75 volts, the microprocessor 14 shuts off the charging current.

If the microprocessor 14 fails to discontinue the charging current at the first predetermined temperature (preferably 125°), a continued increase in battery temperature causes the resistance of the thermistor 38 to further decrease, causing the voltage at the junction of the thermistor 38 and resistor 40 to further rise. When the temperature of the battery reaches a second predetermined temperature preferably 130° F., the voltage level at the junction of the thermistor 38 and resistor 40 rises to about 4 volts. If a four-volt level is present at the junction, the output of amplifier 44 goes low, cutting off transistor 54, which shuts off the MOSFET 42, causing the discontinuation of the charging current.

Figure 4A:
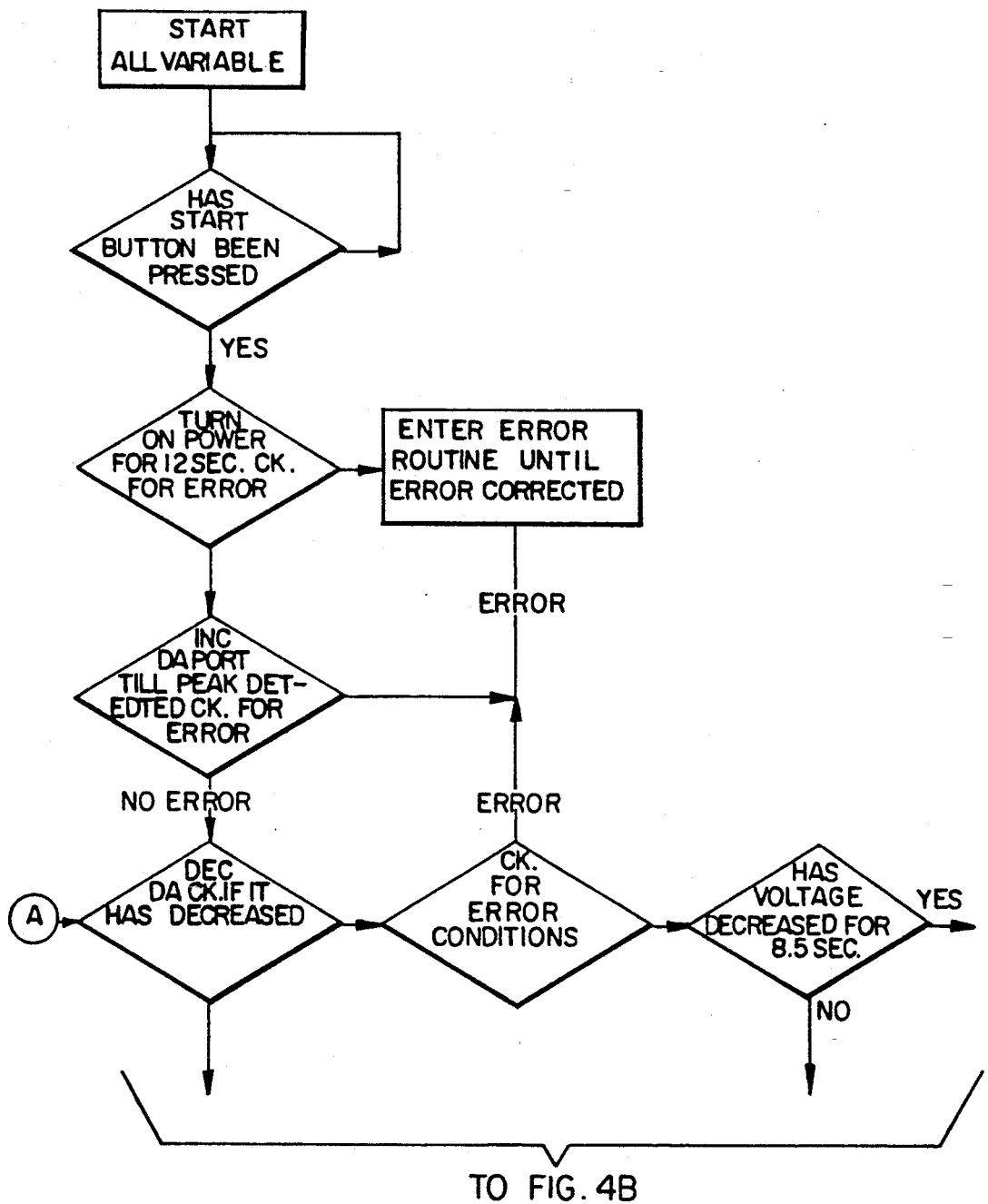
FIG. 4 (A-B) is a flow chart showing the preferred operation of the computer control means of FIG. 1.
Figure 4B:
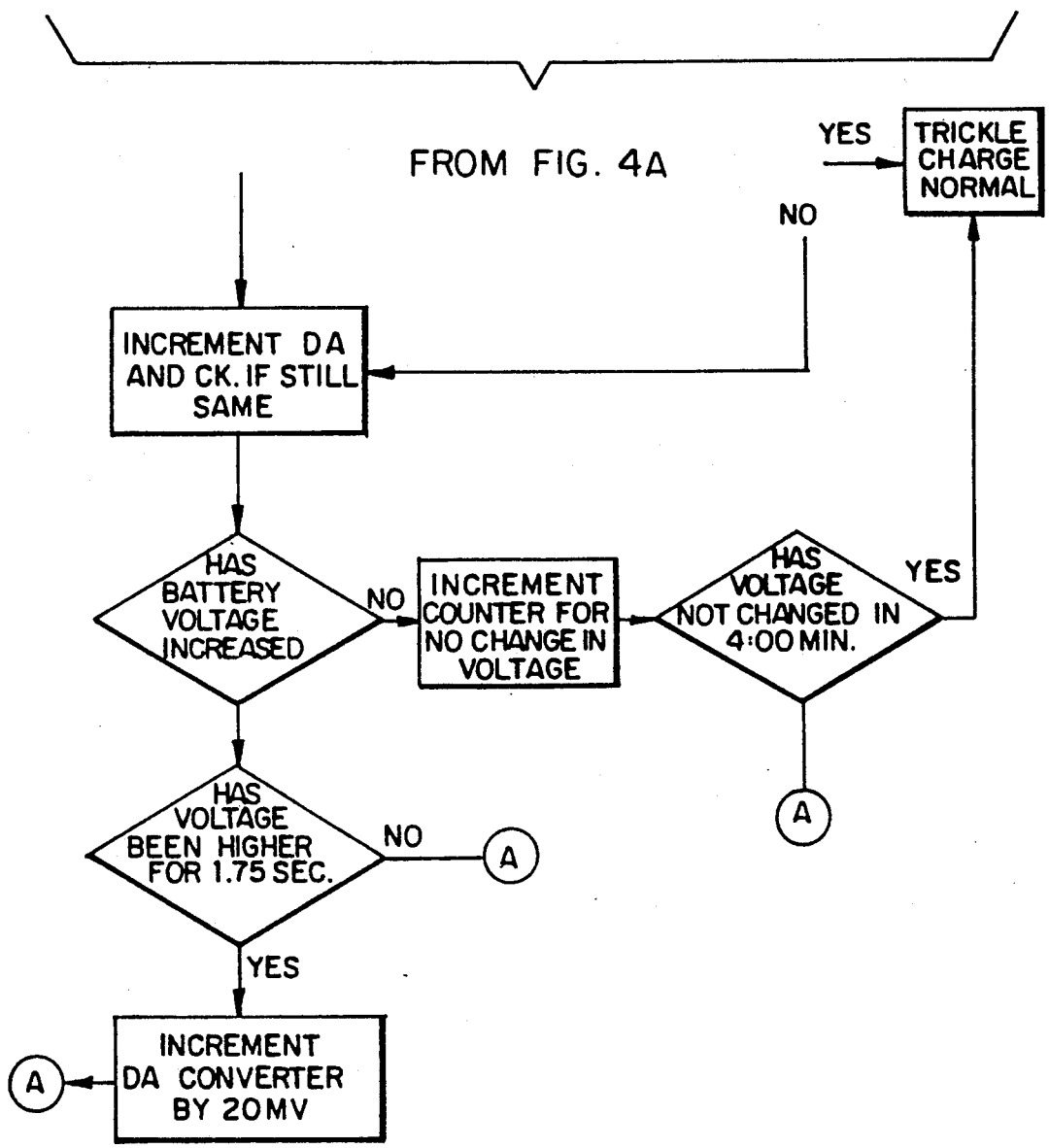

Use of the microprocessor 14, allows for the battery charger 10 to be microprocessor-driven. FIG. 4 is a flow chart showing how the microprocessor controls the operation of the charger. When the microprocessor is powered on, all of the variables contained within the program controlling the microprocessor are initialized. The microprocessor then waits to ascertain if the user of the charger has pressed the start charge switch to begin the charging of the battery. Once the start charge switch has been activated, the program checks to see if the battery being charged is of a high capacity and if it is being charged from an automobile battery. If this is the case, the charger is set to a pulse charge. Otherwise, the charger is set to a normal charging current. Next, the program checks to see if the measured voltage of the battery is too high. If it is, the program returns to the beginning and reinitializes the variables. If the battery voltage is not at too high a level, the microprocessor determines if the battery temperature is above the first predetermined level. If the temperature is not above the first predetermined level, the program checks to see if any error conditions exists during a predetermined short time, preferably about twelve seconds. The error conditions that are being checked preferably include a defective battery, a nonconnected battery, a nonconnected power source, or an incorrect setting of the voltage selector for the battery being charged.

If there are not any error conditions present, the program increments the DA output (reference voltage) until it is equal to the conditioned voltage of the battery. The program during the increment period continuously checks for the presence of error conditions. Once the DA output reaches the level of the conditioned battery voltage, the program then looks for a drop in conditioned battery voltage while simultaneously and continuously monitoring the battery temperature. When checking for a drop in the conditioned battery voltage, the DA output is decremented by a predetermined value, preferably 20 millivolts. If the program detects an increased conditioned battery voltage above this level, it continues onward. If the program detects a drop in conditioned battery voltage, the program proceeds into a routine to ascertain if the decrease in the conditioned battery voltage is valid. The clock ascertains if the conditioned battery voltage continues to decrease for the first predetermined time period, preferably 8.5 seconds. If the decrease is valid, the program proceeds into a trickle charge routine. If it is not valid, the first predetermined time period is reset by the timing means.

If the conditioned battery voltage does not drop, the program increments the DA converter by a predetermined level, preferably 20 millivolts to check if the conditioned battery voltage is at the same level. If the conditioned battery voltage does not rise by the preferred increment in the second predetermined time period, preferably four minutes, the programs determines if the battery is fully charged. If it is determined that the battery is fully charged, the program then proceeds into the trickle charge routine. If the conditioned battery voltage has increased, the program checks to ascertain if the voltage remains constant for the third predetermined time period, preferably 1.75 seconds before incrementing the DA converter.

Thus, with the present invention, different batteries can be charged by using a power source comprising an AC power supply or an automobile battery. The charger is designed to provide rapid charging of a battery without the dangers of overcharging. Additionally, the charger includes multiple safety features in order to prevent damage to the battery.

From the foregoing description, it can be seen that the present invention comprises a microprocessor controlled battery charger in which a microprocessor enables a battery to be charged by a voltage source while simultaneously receiving information as to the current voltage of the battery to maintain control of the charging of the battery. It will be appreciated by those skilled in the art that changes and modifications may be made to the above-described embodiment without departing from the inventive concepts thereof. It is understood therefore, that the present invention should not be limited to the particular embodiment disclosed, but should include all modifications and changes which are within the scope and spirit of the invention, as defined by the appended claims.

I claim:

1. A battery charger for rapidly charging a battery comprising:
    a voltage source connected to the battery with a charge line supplying charging current to the battery at a selected current value;
    sensing means for continuously sensing the voltage of the battery and for providing a conditioned battery voltage output;
    a voltage reference generator for generating a reference voltage equal to the conditioned battery voltage at the beginning of a charging cycle and for increasing the reference voltage in predetermined voltage increments as the battery voltage increases during the charging cycle until the battery voltage reaches a peak voltage;
    comparison means for receiving both the reference voltage and the conditioned battery voltage, for comparing the conditioned battery voltage to the reference voltage and for generating an output signal;
    computer control means for receiving the output signal from the comparison means and for controlling the charging of the battery according to the results of the comparison, the control means causing the reference voltage generator to increase the reference voltage by a predetermined voltage increment if the conditioned battery voltage is greater than the reference voltage and for decreasing the charging current to a trickle charge if the conditioned battery voltage is less than the reference voltage for a first predetermined time period, wherein if the computer control means determines the battery voltage is increasing during the first predetermined time period but does not increase by the predetermined voltage increment during a second predetermined time period, the computer control means decreases the charging current to a trickle charge.

2. The battery charger as recited in claim 1, wherein if the battery voltage increases by the predetermined voltage increment in the second predetermined time period, the computer control means determines if the battery voltage increases for a third predetermined time period before causing the reference generator to increase the reference voltage.

3. The battery charger as recited in claim 1 further comprising:
    a temperature sensing means in communication with the computer control means and the voltage source for continuously sensing the temperature of the battery, wherein if the battery temperature rises above a first predetermined temperature, charging is discontinued.

4. The battery charger as recited in claim 3, wherein if the battery temperature rises above a second predetermined temperature, the voltage source discontinues supplying the charging current to the battery.

5. The battery charger as recited in claim 1, including means for indicating when the charging current is being supplied to the battery and when a trickle charge is being supplied to the battery.

6. The battery charger as recited in claim 1, wherein the computer control means includes means for adjusting the charging current for batteries with differing voltage capacities.

7. The battery charger as recited in claim 6, wherein said battery charger includes selector means for allowing a user to select the charging current to be supplied to the battery based upon the battery capacity.

8. The battery charger as recited in claim 1, wherein the computer control means comprises a microprocessor which includes a timing means for establishing the first and second predetermined time periods.

* * * * *